United States Patent [19]
O'Donnell et al.

[11] Patent Number: 5,732,046
[45] Date of Patent: Mar. 24, 1998

[54] ACTIVE FIBER-OPTIC OPTO-ACOUSTIC DETECTOR

[76] Inventors: Matthew O'Donnell, 1607 Brooklyn Ave., Ann Arbor, Mich. 48104; James D. Hamilton, 1805 Willowtree La. #A4, Ann Arbor, Mich. 48105; Gerald Vossler, 1843 McIntyre, Ann Arbor, Mich. 48105; Cameron Brooks, 2200 Fuller Rd. #4018, Ann Arbor, Mich. 48105

[21] Appl. No.: 635,362

[22] Filed: Apr. 19, 1996

[51] Int. Cl.$^6$ .................................................. H04R 23/00
[52] U.S. Cl. .............. 367/149; 73/632; 73/657; 356/256; 356/345
[58] Field of Search .................... 367/149; 73/632, 73/655, 657; 356/256, 345

[56] References Cited

U.S. PATENT DOCUMENTS

| | | | |
|---|---|---|---|
| 5,305,335 | 4/1994 | Ball et al. | 372/6 |
| 5,323,404 | 6/1994 | Grubb | 372/6 |
| 5,353,262 | 10/1994 | Yakymyshyn et al. | 367/149 |
| 5,381,426 | 1/1995 | Fontana et al. | 372/18 |
| 5,590,090 | 12/1996 | Duggal et al. | 367/7 |

OTHER PUBLICATIONS

"Optical Detection of Ultrasound with a Microchip Laser", A.R. Duggal et al., Optics Letters 19, p. 755, May 1994.

"Generation of Elastic Waves by Transient Surface Heating", R. M. White Journal of Applied Physics, vol. 34, No. 12, Dec. 1963, pp. 3559–3567.

"Thermoelastic Generation of Elastic Waves for Non-Destructive Testing and Medical Diagnosis", R. J. Von Gutfeld, Ultrasonics, Jul. 1980, pp. 175–181.

"Ultrasonic Noncontact Inspection System with Optical Fiber Methods", A.J.A. Bruinsma J.A. Vogel, Applied Optics, vol. 27, No. 22, Nov. 15, 1988, pp. 4690–4695.

*Primary Examiner*—J. Woodrow Eldred
*Attorney, Agent, or Firm*—Brooks & Kushman P.C.

[57] ABSTRACT

An opto-acoustic detector includes a fiber laser having a cavity which includes an optical fiber having an active medium portion doped with a gain material so that the detector may be used in high frequency, high density arrays. The cavity is bounded by a frequency selective reflector and a broadband or frequency selective reflector adapted to be acoustically coupled to a medium supporting ultrasound radiation (i.e. acoustic waves). In one embodiment, the frequency selective reflector is a diffraction grating placed external to the optical fiber. In another embodiment, the frequency selective reflector is a narrowband reflector placed directly in the optical fiber. An acoustic signal enhancing feature which increases sensitivity of the detector is provided by utilizing a reflective membrane having a thickness substantially less than the acoustic wavelength, $\lambda$, as the broadband optical reflector. The membrane is displaced from a free end of the optical fiber in the cavity and a laser beam exiting therefrom is focused on the membrane with a spot size on the order of the optical fiber core diameter. In this way, the sensing area of the detector is essentially the cross-sectional area of the fiber core which is typically comparable to or less than $\lambda^2$ even at ultrasound operating frequencies greater than 500 MHz. The reduced element size permits closely spaced optical detectors enabling high density arrays for high frequency imaging.

24 Claims, 2 Drawing Sheets

ACTIVE FIBER-OPTIC OPTO-ACOUSTIC DETECTOR

CROSS-REFERENCE TO RELATED APPLICATION

This application is related to U.S. patent application entitled "Method and System for 3-D Acoustic Microscopy Using Short Pulse Excitation and 3-D Acoustic Microscope for Use Therein," having the same assignee and filed on the same day as the present application.

TECHNICAL FIELD

This invention relates to opto-acoustic detectors and, in particular, to active opto-acoustic detectors.

BACKGROUND ART

Optical detection of ultrasound offers unique advantages over conventional schemes. The foremost is in high frequency applications where optical detection beams can be focused to very small areas using simple lensing to produce a very small equivalent ultrasound array element. Optical systems also offer large detection bandwidths and reduced signal corruption associated with conventional cabling and interconnects.

Low sensitivity is the primary problem with optical detection of ultrasound. Most systems employ interferometric, surface grating, knife edge or other passive techniques to obtain ultrasound displacement information from the reflected probe beam. These methods are limited in optical signal power and are inherently insensitive to small surface displacements.

The use of active optical detectors for sound was proposed in the article "Laser Hydrophone" by Y. A. Bykovskii et al., in *SOV. PHYS. ACOUST.* 34, p. 204, March 1988. This was applied to ultrasound imaging in "Optical Detection of Ultrasound with a Microchip Laser" by A. R. Duggal et al., in *OPTICS LETTERS* 19, p. 755, May 1994.

The U.S. patent to Yakymyshyn et al. No. 5,353,262 discloses an active detector with increased sensitivity over some of the previous approaches.

SUMMARY OF THE INVENTION

An object of the present invention is to provide an active fiber-optic, opto-acoustic detector which is simple, robust, and sensitive and which may be used in high frequency, high density arrays.

Another object of the present invention is to provide an active fiber-optic, opto-acoustic detector which maintains the spatial sampling and bandwidth advantages of focused probe beam detectors.

In carrying out the above objects and other objects of the present invention, an opto-acoustic detector for detecting and measuring an acoustic wave propagated through a medium is provided. The detector includes a fiber laser and a coupler for coupling controlled energy to the fiber laser. The fiber laser includes a cavity bounded by first and second reflectors. The cavity includes an optical fiber having an active medium portion doped with a gain material. The first and second reflectors are disposed at opposite ends of the cavity such that a lasing output signal having a single frequency is generated by the fiber laser upon receiving the controlled energy. The frequency spectrum of the lasing output signal is a measure of the acoustic wave incident on the second reflector. In this way, the cavity of the fiber laser is modulated by the acoustic wave.

Preferably, the acoustic wave is an ultrasonic wave having a wavelength, $\lambda$. A cross-sectional area of the cavity substantially perpendicular to the laser path axis of the cavity is approximately equal to $\lambda^2$.

Also, to increase sensitivity of the detector, preferably the second reflector includes a reflective membrane adapted to be acoustically coupled to the medium and spaced away from a free end of the optical fiber. The reflective membrane has thickness less than $\lambda$ wherein a laser beam exiting the free end of the optical fiber is focused on the reflective member with the spot size having a diameter substantially equal to the diameter of the optical fiber core.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

In general, an opto-acoustic detector constructed in accordance with the present invention is particularly useful in high frequency ultrasound array imaging. The opto-acoustic detector includes a fiber laser for generating optical frequencies related to ultrasound pressure waves incident on the detector. The optical cavity of the fiber laser is modulated by incident acoustic pressure such that changes in optical path length and phase are induced, modulating the optical frequency. The optical cavity is disposed such that its cross-sectional area perpendicular to the optical path is less than or comparable to $\lambda^2$, where $\lambda$ is the wavelength of the incident ultrasound.

Figure 1:
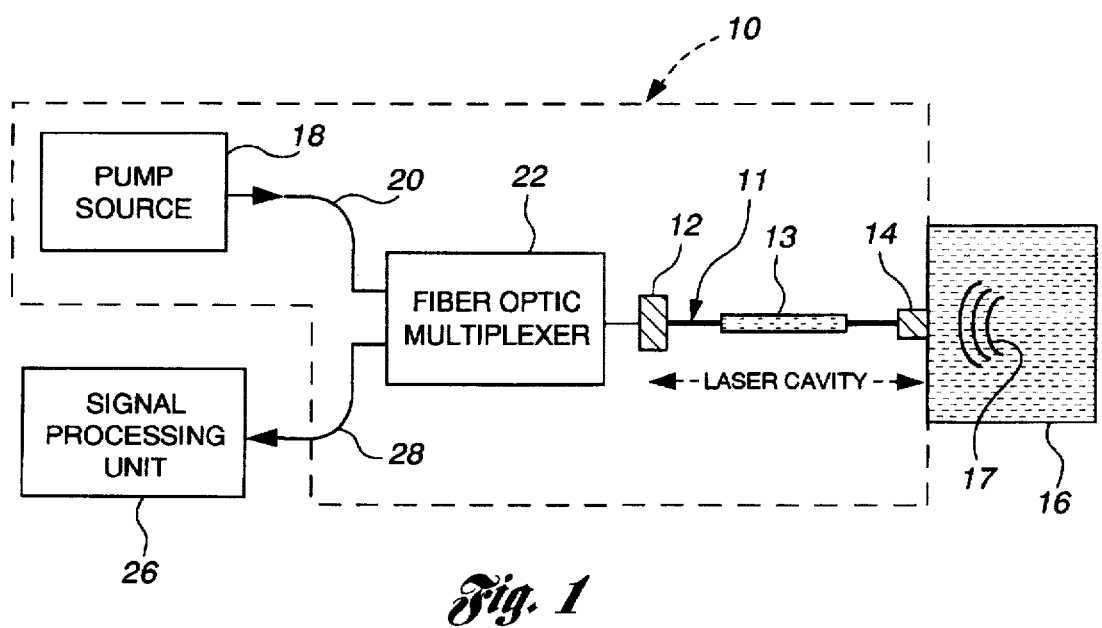
FIG. 1 is a schematic block diagram of an active fiber-optic opto-acoustic detector constructed in accordance with the present invention.

One possible embodiment of the opto-acoustic detector is generally indicated at 10 in FIG. 1. The laser cavity has an optical fiber, generally indicated at 11, bounded by first and second reflectors 12 and 14, respectively, on opposite sides of the laser cavity. The reflectors 12 and 14 are disposed such that a single longitudinal mode is supported by the laser cavity.

The second reflector 14 is acoustically coupled to a medium 16 supporting the ultrasound radiation or waves 17.

Either reflector 12 and/or reflector 14 have a frequency response which limits the linewidth of the laser output, thereby enabling single mode operation.

The opto-acoustic detector also includes an active medium 13 which is a section or portion of the optical fiber 11 doped with a gain material that converts incident pump to laser power.

Figure 2A:
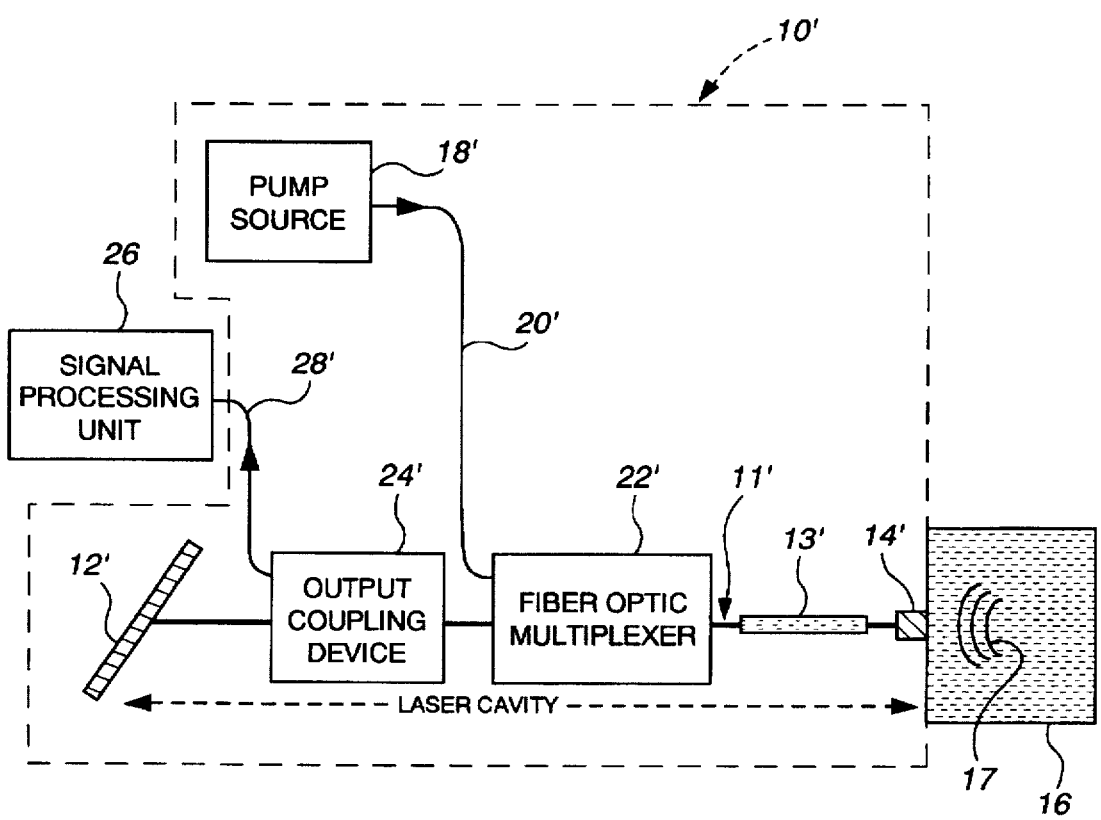
FIG. 2a is a schematic block diagram similar to the schematic block diagram of FIG. 1 having a diffraction grating external to an optical fiber of the detector.

Pump power is delivered to the laser cavity from an external pump source 18, typically a semiconductor laser diode, via an optical fiber 20 and coupled to the detector's laser cavity by a fiber-optic multiplexer 22. The signal power is recovered from the detector 10 through the multiplexer 22 or another output coupling device (such as illustrated in FIG. 2a at reference numeral 24'), and transmitted to a signal processing unit 26 via another optical fiber 28. The unit 26 is responsible for generating an output signal corresponding to the received acoustic pressure incident on the detector 10.

There exists various implementations for the frequency selective reflector in the fiber-optic ultrasound detector 10. One such implementation is shown in FIG. 2a with respect to a second embodiment of an opto-acoustic detector 10'. Elements of the detector 10' which have the same or similar functions as the first embodiment of the detector 10 have the same reference numeral but a single prime designation.

The detector 10' includes a diffraction grating 12' placed external to the optical fiber 11'. The grating 12' is disposed to allow single mode operation by coupling frequency limited feedback into the optical fiber 11'.

Figure 2B:
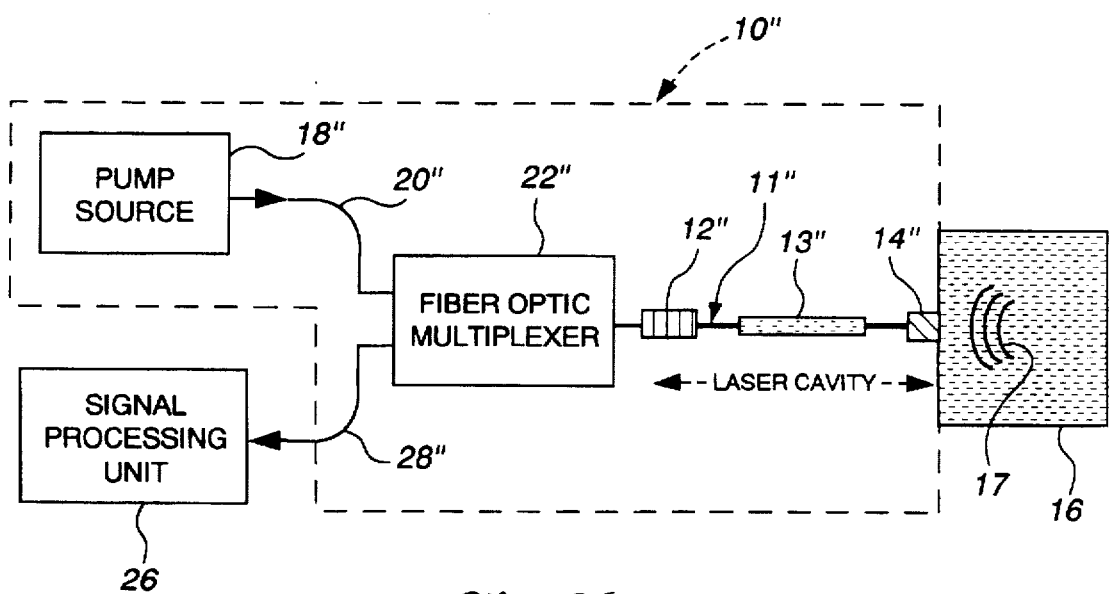
FIG. 2b is a schematic block diagram similar to the schematic block diagram of FIG. 1 but having a narrowband reflector integrated with the optical fiber.

An alternate approach is shown in FIG. 2b with respect to a third embodiment of an opto-acoustic detector 10". Elements of the detector 10" which have the same or similar functions as the elements of the first two embodiments have the same reference numeral but a double prime designation. The detector 10" includes an integrated narrowband reflector 12" which can be placed directly in the optical fiber 11" to limit lasing to a single longitudinal mode in the absence of acoustic modulation.

An enhancement to each of the ultrasound detectors 10, 10' and 10" is an acoustic signal enhancing feature. This feature allows for greater surface displacements involving the aforementioned broadband reflectors 14, 14' and 14". The enhanced displacements cause greater fluctuations in the optical path length of the fiber laser cavity, thereby increasing the sensitivity of the detectors 10, 10' and 10".

Figure 3:
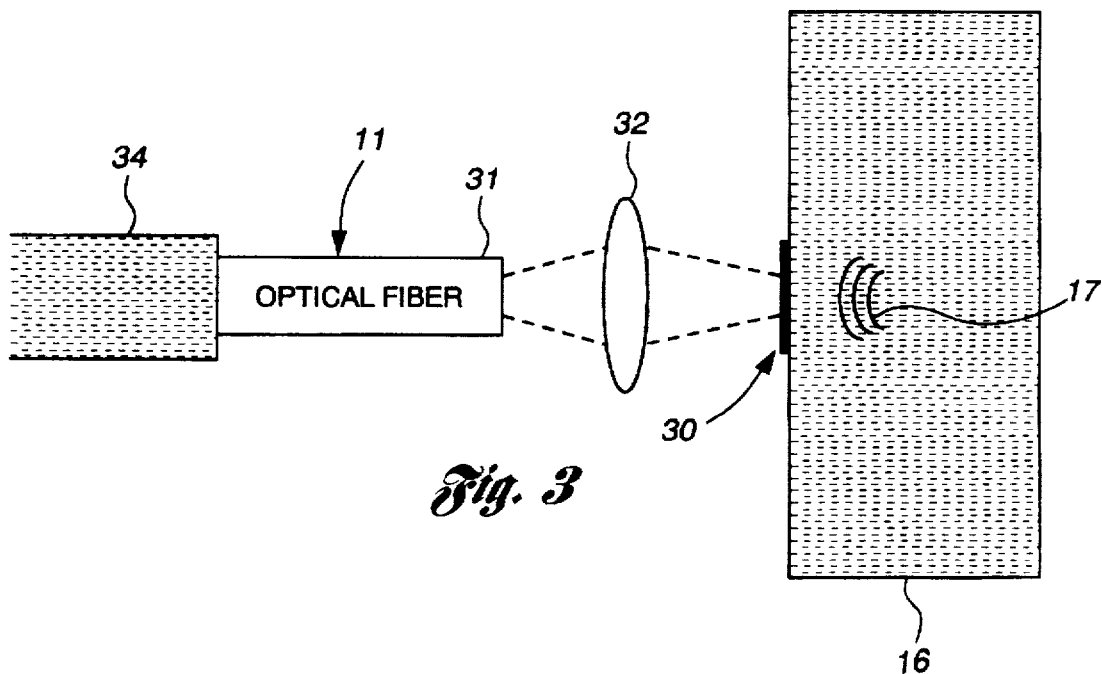
FIG. 3 is an enlarged, broken-away, schematic block diagram view illustrating an acoustic signal enhancing feature of the detector.

An example is illustrated in FIG. 3 and includes a reflective membrane 30 having a thickness less than a wavelength, $\lambda$, of the acoustic wave 17. The membrane 30 is displaced from a free end 31 of the optical fiber 11 opposite active medium 34 and a laser beam exiting therefrom is focused on the membrane 30 with a spot size on the order of the optical fiber core diameter. The membrane 30 is acoustically coupled to the medium 16 supporting the ultrasound radiation. Any material in the non-fiber section of the laser cavity, between a focusing element 32 and the membrane 30, is optically transparent, with a significantly different acoustic impedance than the material (i.e. medium 16) on the opposite side of the membrane 30. The large acoustic impedance change at the membrane 30 causes enhanced displacements of the reflectors 14, 14' and 14", increasing sensitivity.

A further extension of the present invention is the use of such fiber-optic ultrasound detectors 10, 10' and 10" in high density, high frequency arrays (not shown). In arrays of this type, the equivalent ultrasound element size is determined by the sensing area of the optical detector 10, 10' and 10". For the fiber-optic device of the present invention, the sensing area is essentially the cross-sectional area of the fiber core, typically comparable to or less than $\lambda^2$, even at ultrasound operating frequencies greater than 500 MHz. The reduced element size permits closely spaced optical detectors 10, 10' or 10", enabling high density arrays for high frequency imaging. In addition, high density fiber arrays can deliver optical excitation pulses to create an acoustic transmitting array. The wavelength of the excitation pulse is selected to be different than the lasing wavelength of the fiber cavity. Either the acoustically coupled reflector absorbs the excitation pulse at this wavelength, or the acoustically coupled reflector is transparent to this wavelength and passes the excitation pulse to an appropriate absorber.

While the best mode for carrying out the invention has been described in detail, those familiar with the art to which this invention relates will recognize various alternative designs and embodiments for practicing the invention as defined by the following claims.

What is claimed is:

1. An opto-acoustic detector for detecting and measuring an acoustic wave propagated through a medium, the detector comprising:

a fiber laser; and a coupler for coupling controlled energy to the fiber laser, the fiber laser including a cavity bounded by first and second reflectors, the cavity including an optical fiber having an active medium portion doped with a gain material, the first and second reflectors being disposed at opposite ends of the cavity such that a lasing output signal having a single frequency is generated by the fiber laser upon receiving the controlled energy, the frequency spectrum of the lasing output signal being a measure of the acoustic wave incident on the second reflector wherein the second reflector includes a reflective membrane adapted to be acoustically coupled to the medium and spaced away from a free end of the optical fiber whereby the cavity of the fiber laser is modulated by the acoustic wave.

2. The detector as claimed in claim 1 wherein the first reflector is a diffraction grating disposed external to the optical fiber.

3. The detector as claimed in claim 1 wherein either the first reflector and/or the second reflector is a narrowband reflector disposed internal to the optical fiber.

4. The detector as claimed in claim 3 wherein the acoustic wave has a wavelength, $\lambda$, and wherein the reflective membrane has a thickness less than $\lambda$.

5. The detector as claimed in claim 3 further comprising a focusing element disposed between the free end of the optical fiber and the reflective membrane to focus a laser beam exiting the free end of the optical fiber onto the reflective membrane.

6. The detector as claimed in claim 5 wherein the optical fiber includes a core having a diameter and wherein the laser beam exiting the free end of the optical fiber is focused onto the reflective membrane with a spot size having a diameter approximately equal to the diameter of the optical fiber core.

7. The detector as claimed in claim 1 wherein the acoustic wave is an ultrasonic wave.

8. The detector as claimed in claim 7 wherein the cavity has a lasing axis and the ultrasonic wave has a wavelength, $\lambda$, and wherein a cross-sectional area of the cavity substantially perpendicular to the lasing axis is approximately equal to $\lambda^2$.

9. The detector as claimed in claim 1 wherein the second reflector is adapted to be acoustically coupled to the medium and is a dielectric material.

10. The detector as claimed in claim 1 further comprising a pump beam coupled to the cavity by the coupler to supply the controlled energy to the active medium portion of the optical fiber.

11. The detector as claimed in claim 1 wherein the coupler includes a fiber-optic multiplexer for coupling the controlled energy to the cavity.

12. The detector as claimed in claim 1 wherein the first reflector is a frequency selective reflector.

13. An opto-acoustic detector for detecting and measuring an acoustic wave propagated through a medium, the detector comprising:

a fiber laser; and a coupler for coupling controlled energy to the fiber laser, the fiber laser including a cavity bounded by first and second reflectors, the cavity including an optical fiber having an active medium portion doped with a gain material, the first and second reflectors being disposed at opposite ends of the cavity such that a lasing output signal having a single frequency is generated by the fiber laser upon receiving the controlled energy, the frequency spectrum of the lasing output signal being a measure of the acoustic wave incident on the second reflector wherein the cavity has a lasing axis and the acoustic wave has a wavelength, $\lambda$, and wherein a cross-sectional area of the cavity substantially perpendicular to the lasing axis is approximately equal to $\lambda^2$ whereby the cavity of the fiber laser is modulated by the acoustic wave.

14. The detector as claimed in claim 13 wherein the first reflector is a diffraction grating disposed external to the optical fiber.

15. The detector as claimed in claim 13 wherein either the first reflector and/or the second reflector is a narrowband reflector disposed internal to the optical fiber.

16. The detector as claimed in claim 13 wherein the second reflector includes a reflective membrane adapted to be acoustically coupled to the medium and spaced away from a free end of the optical fiber.

17. The detector as claimed in claim 16 wherein the acoustic wave has a wavelength, $\lambda$, and wherein the reflective membrane has a thickness less than $\lambda$.

18. The detector as claimed in claim 16 further comprising a focusing element disposed between the free end of the optical fiber and the reflective membrane to focus a laser beam exiting the free end of the optical fiber onto the reflective membrane.

19. The detector as claimed in claim 18 wherein the optical fiber includes a core having a diameter and wherein the laser beam exiting the free end of the optical fiber is focused onto the reflective membrane with a spot size having a diameter approximately equal to the diameter of the optical fiber core.

20. The detector as claimed in claim 18 wherein the acoustic wave is an ultrasonic wave.

21. The detector as claimed in claim 13 wherein the second reflector is adapted to be acoustically coupled to the medium and is a dielectric material.

22. The detector as claimed in claim 13 further comprising a pump beam coupled to the cavity by the coupler to supply the controlled energy to the active medium portion of the optical fiber.

23. The detector as claimed in claim 13 wherein the coupler includes a fiber-optic multiplexer for coupling the controlled energy to the cavity.

24. The detector as claimed in claim 13 wherein the first reflector is a frequency selective reflector.

\* \* \* \* \*